(12) United States Patent
Carpenter et al.

(10) Patent No.: US 10,981,486 B2
(45) Date of Patent: Apr. 20, 2021

(54) AUTOMATIC PARCEL ACCUMULATION TRANSFER SYSTEM

(71) Applicant: SIEMENS INDUSTRY, INC., Alpharetta, GA (US)

(72) Inventors: Michael D. Carpenter, Arlington, TX (US); Francisco Grupp, Trophy Club, TX (US)

(73) Assignee: Siemens Logistics LLC, DFW Airport, TX (US)

( * ) Notice: Subject to any disclaimer, the term of this patent is extended or adjusted under 35 U.S.C. 154(b) by 183 days.

(21) Appl. No.: 16/051,866

(22) Filed: Aug. 1, 2018

(65) Prior Publication Data

US 2019/0039494 A1 Feb. 7, 2019

Related U.S. Application Data

(60) Provisional application No. 62/539,679, filed on Aug. 1, 2017.

(51) Int. Cl.
| | | |
|---|---|---|
| *B65H 1/08* | (2006.01) | |
| *B60P 1/36* | (2006.01) | |
| *B60P 1/38* | (2006.01) | |
| *B65G 67/20* | (2006.01) | |
| *B65G 67/08* | (2006.01) | |

(52) U.S. Cl.
CPC ............... *B60P 1/365* (2013.01); *B60P 1/38* (2013.01); *B65G 67/08* (2013.01); *B65G 67/20* (2013.01); *B65G 2201/0285* (2013.01)

(58) Field of Classification Search
CPC .......... B60P 1/365; B65G 67/08; B65G 67/20
See application file for complete search history.

(56) References Cited

U.S. PATENT DOCUMENTS

| | | | | |
|---|---|---|---|---|
| 3,837,508 | A * | 9/1974 | Stefanelli | ............... B60P 1/003 414/510 |
| 3,931,897 | A * | 1/1976 | Bacon | .................... B65G 67/08 414/789.8 |
| 4,518,303 | A | 5/1985 | Moser | |
| 4,747,747 | A | 5/1988 | Fusco et al. | |
| 5,015,145 | A * | 5/1991 | Angell | ................... B65G 61/00 414/391 |
| 5,716,184 | A * | 2/1998 | Lowe | .................... B65G 67/08 414/398 |

(Continued)

FOREIGN PATENT DOCUMENTS

EP 2263952 A1 12/2010

*Primary Examiner* — Mark C Hageman

(57) ABSTRACT

Parcel processing systems and methods. A parcel processing system includes a boom conveyor section configured to extend into a loading area, transport parcels into the loading area, and adjust a height of a discharge end of the boom conveyor section. The parcel processing system includes a sensor pod configured to scan the loading area into which the parcels can be placed. The parcel processing system includes a control system configured to determine a placement of the one or more parcels in the loading area, arrange the one or more parcels on the boom conveyor section according to the determined placement, control the boom conveyor section to transport one or more parcels into the loading area, control the height of the discharge end of the boom conveyor section, and place the one or more parcels into the loading area in the determined placement.

19 Claims, 6 Drawing Sheets

(56) References Cited

U.S. PATENT DOCUMENTS

| | | | | |
|---|---|---|---|---|
| 5,834,706 A * | 11/1998 | Christ | ............... | B07C 5/34 |
| | | | | 177/1 |
| 5,921,740 A * | 7/1999 | Stewart | ............... | B65G 67/08 |
| | | | | 414/398 |
| 6,679,371 B2 * | 1/2004 | Hooijen | ............... | B60P 1/365 |
| | | | | 198/750.1 |
| 7,967,543 B2 * | 6/2011 | Criswell | ............... | B25J 9/0093 |
| | | | | 414/373 |
| 9,434,558 B2 * | 9/2016 | Criswell | ............... | B65G 67/24 |
| 9,517,492 B2 * | 12/2016 | Schwarzbauer | ............... | B65G 37/00 |
| 9,623,569 B2 * | 4/2017 | McCollum | ............... | B25J 9/0093 |
| 9,688,489 B1 * | 6/2017 | Zevenbergen | ............... | B65G 67/20 |
| 10,029,374 B2 * | 7/2018 | McCollum | ............... | B25J 15/0014 |
| 10,294,046 B2 * | 5/2019 | Hart | ............... | B65G 21/10 |
| 10,329,096 B2 * | 6/2019 | Becher | ............... | G06Q 10/083 |
| 10,577,201 B2 * | 3/2020 | Putcha | ............... | B65G 67/08 |
| 2018/0118476 A1 * | 5/2018 | Bastian, II | ............... | B65G 47/90 |

* cited by examiner

AUTOMATIC PARCEL ACCUMULATION TRANSFER SYSTEM

CROSS-REFERENCE TO OTHER APPLICATION

This application claims the benefit of the filing date of U.S. Provisional Patent Application 62/539,679, filed Aug. 1, 2017, which is hereby incorporated by reference.

TECHNICAL FIELD

Aspects of the present application generally relate to processing parcels, which can include any mail, package, flat, box, or similar object to be transported. In particular, aspects of the present application address automatic loading, accumulation, and unloading of parcels.

BACKGROUND OF THE DISCLOSURE

The common method of loading, accumulation, and unloading of parcels involves the manual loading and unloading of trailers. Improved systems and methods are desirable.

SUMMARY OF THE DISCLOSURE

Disclosed embodiments relate to systems and methods for an automatic parcel accumulation transfer system, and other devices, systems, and methods as disclosed herein.

A parcel processing system includes a boom conveyor section configured to extend into a loading area, transport parcels into the loading area, and adjust a height of a discharge end of the boom conveyor section. The parcel processing system includes a sensor pod configured to scan the loading area into which the parcels can be placed. The parcel processing system includes a control system configured to determine a placement of the one or more parcels in the loading area, arrange the one or more parcels on the boom conveyor section according to the determined placement, control the boom conveyor section to transport one or more parcels into the loading area, control the height of the discharge end of the boom conveyor section, and place the one or more parcels into the loading area in the determined placement.

In some embodiments, the loading area is a parcel pallet, a trailer, or a container that has a bi-directional conveyor disposed along a floor of the loading area, and a backstop structure is mounted on the bi-directional conveyor. In some embodiments, the determined placement includes an offset corresponding to a parcel already in the container. In some embodiments, the control system is configured to obtain a dimension of the one or more parcels and arrange the one or more parcels according to the determined dimension. In some embodiments, the dimension of the one or more parcels is obtained using a profiling sensor to measure the dimension of the one or more parcels. Some embodiments include an aligning system configured to arrange the one or more parcels. In some embodiments, the control system is further configured to accumulate and arrange the one or more parcels into a course of parcels that are placed together by the parcel processing system into the determined placement. In some embodiments, the determined placement is on a bi-directional conveyor disposed on a floor of the loading area. In some embodiments, the determined placement is against a back-stop structure mounted on a bi-directional conveyor disposed on a floor of the loading area. In some embodiments, the determined placement is stacked on top of one or more parcels already in the loading area. In some embodiments, the control system is connected to control the motion of a bi-directional conveyor disposed on a floor of the loading area. In some embodiments, the control system is connected to control the motion of a bi-directional conveyor disposed on a floor of the loading area to unload the parcels from the loading area. In some embodiments, the control system is configured to track positions of the one or more parcels.

A method performed by a parcel processing system includes receiving one or more parcels for placement in a loading area, determining a placement of the one or more parcels in the loading area, physically arranging the one or more parcels on a boom conveyor section according to the determined placement, transporting the one or more arranged parcels along the boom conveyor section into the loading area, adjusting the height of a discharge end of the boom conveyor section according to the determined placement, and placing the one or more parcels into the loading area according to the determined placement.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
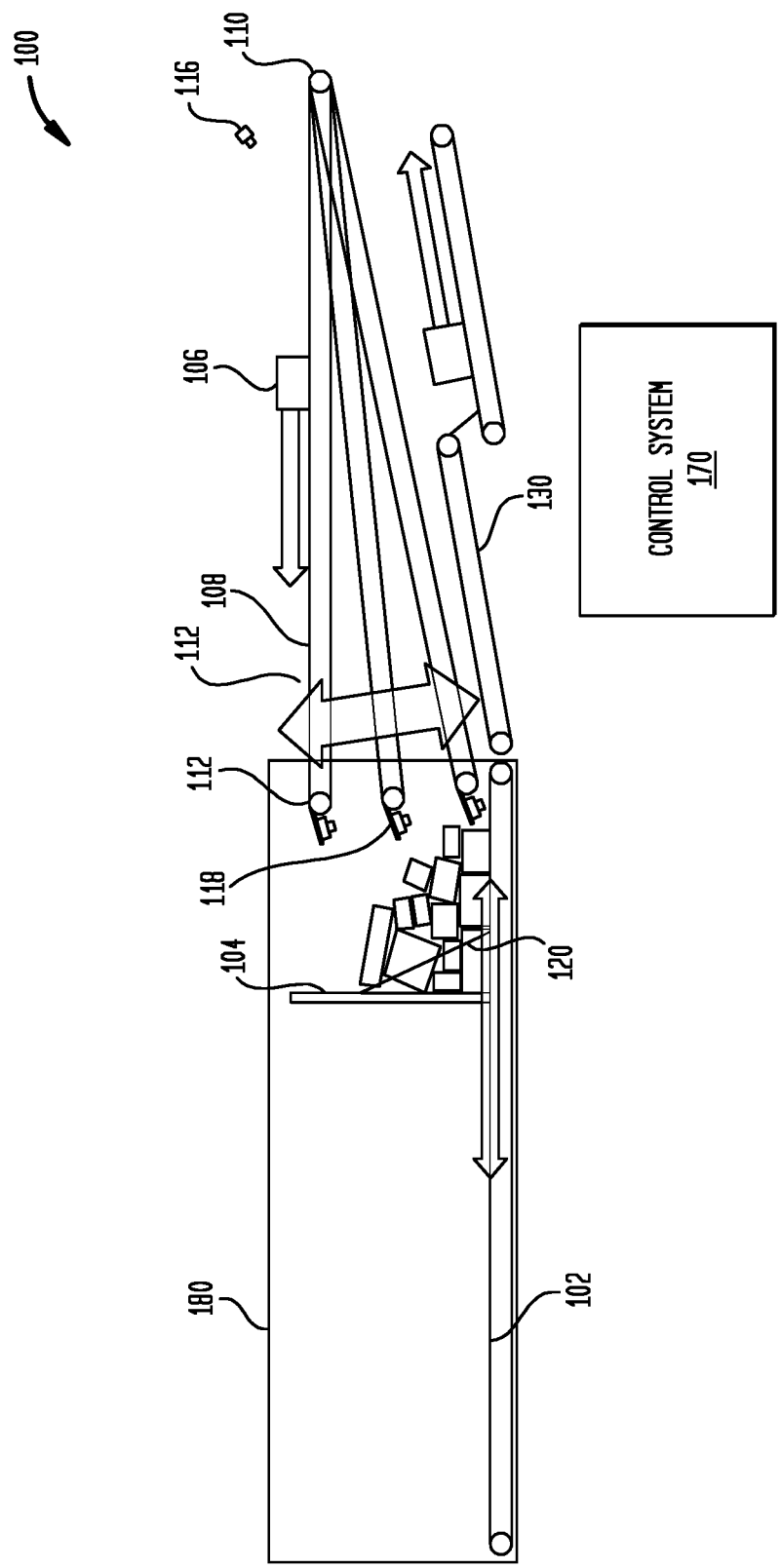
FIG. 1 illustrates an example of a parcel processing system in accordance with disclosed embodiments.

The figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

As described above, a common method of loading, accumulation, and unloading of parcels involves the manual loading and unloading of trailers. Manual loading offers optimal volumetric utilization but realizes about half of the productivity of manual unloading.

High volumetric utilization in loading is more important in certain operations, such as those involving loaded containers travelling relatively long distances, or with high volume transfers in which latency is not crucial. Other operations, such as accumulating a volume of sorted items for a subsequent operation, do not need high volumetric utilization.

One approach to reducing the labor involved in loading and unloading has involved installing a conveyor into the floor of a container or trailer. In the U.S., this approach was initially taught in U.S. Pat. No. 4,518,303, hereby incorporated by reference. According to that patent, the floor of a trailer is replaced with a conventional conveyor, which is used to drive the load out of the trailer.

U.S. Pat. No. 4,747,747, hereby incorporated by reference, describes a function of loading. The conveyor at the base of the trailer can be run in two directions rather than just one.

Another recently developed system is seen in European Patent application EP2263952, hereby incorporated by reference. In this system, a conveyor above the trailer conveys items to the front end of the trailer, where a door, hinged from the bottom and opening at the top, is installed. The door forms part of a chute, into which items conveyed the length of a conveyor fall through an opening and onto another conveyor mounted into the floor of the trailer. In this system, the conveyor only moves in the direction towards the typical rear door location. This system would realize very low volumetric efficiency and would cause excessive damage to packages. The trailer is relatively complex and unique.

Disclosed embodiments include automatic loading, buffering and unloading of parcels and other goods, such as to and from specified loading areas, including specialized pallets, trailers, and other shipping containers, and improve upon the techniques described above. Disclosed embodiments improve on other systems that are undesirable, and have not been commercially successful, in several ways, including (but not limited to):

Disclosed embodiments reduce or eliminate potential package damage caused by the drop from conveyor to conveyor and when packages strike one another when dropped.

Disclosed embodiments improve on the low volumetric utilization of the trailer in other systems.

Disclosed embodiments eliminate the need for specialized door designs at the front of the trailer that add cost and complexity to an already complex design.

FIG. 1 illustrates an example of a parcel processing system 100 in accordance with disclosed embodiments. Disclosed embodiments can eliminate labor associated with loading and unloading in instances in which very high volumetric utilization is not needed. In addition, the problems of package damage and volumetric utilization are improved, and the cost and complexity of the trailer or other container is reduced. Parcel processing system 100 and its elements are controlled by control system 170, which can be implemented, for example as data processing system 400 in FIG. 4. The control system 170 can control the physical components of parcel processing system 100 to perform operations including those as disclosed herein.

The area to which the parcels are to be loaded is referred to herein as the "loading area." The loading area can be simply a specific area, such as in a warehouse or shipping facility, into which the parcels are to be loaded. In some embodiments, the loading area is on a parcel pallet, which can then be stored or loaded into trailers or other containers. In various embodiments, parcel pallets have two structures, a floor and a single wall, corresponding to two sides of a six-sided trailer or container: the floor and front wall. The "front" wall of parcel pallet refers to a wall on the end, lengthwise, of the pallet, which would typically be loaded first into a trailer so that it is adjacent to the trailer's front wall. The parcel pallet can include a belt mounting system, configured on the floor and/or front wall of the parcel pallet, to support subsequent automatic unloading.

In other cases, the loading area is a trailer or other container. In the specific example of FIG. 1, a container 180 is used as the loading area. In this example, a bi-directional conveyor 102 is disposed across the floor of the container 180. Container 180 as shown in FIG. 1 can represent a trailer, shipping container, or any other container or space configured as described, including a parcel pallet as described above.

A back-stop 104 is mounted to the belt and extends upwardly from the belt. Each parcel 106 travels down a conveyor boom section 108 that pivots at one end (end 110 in FIG. 1, the "receive end 110"), allowing the height of the boom at the other end (end 112 in FIG. 1, the "discharge end 112") to be raised or lowered (as illustrated by arrow 114). In general operation, a stream of parcels 106 received at receive end 110, such as from another conveyor section. Conveyor boom section 108 transports each parcel 106 to discharge end 112, where it is discharged. A profiling sensor 116 measures the size and position of items traveling on the conveyor boom section 108. A sensor pod 118 is located at the tip of the pivoting conveyor boom section 108, at or near discharge end 112. The sensor identifies the position and profile of the area 120 in which the parcel 106 will be deposited.

The conveyor boom section 108 may deposit items individually into the area 120. Alternatively, a line of parcels (e.g., across the width of the conveyor) may be accumulated before being moved to the loading position. The conveyor boom section 108 may be designed to accumulate multiple items for loading, either by means of a sectioned conveyor, or by starting and stopping the conveyor boom section 108 as a single unit and tracking the position of multiple items for consecutive loading. During loading, the conveyor bi-directional conveyor 102 may index the distance somewhat longer than the length of the parcel to improve positioning.

Figure 2A:
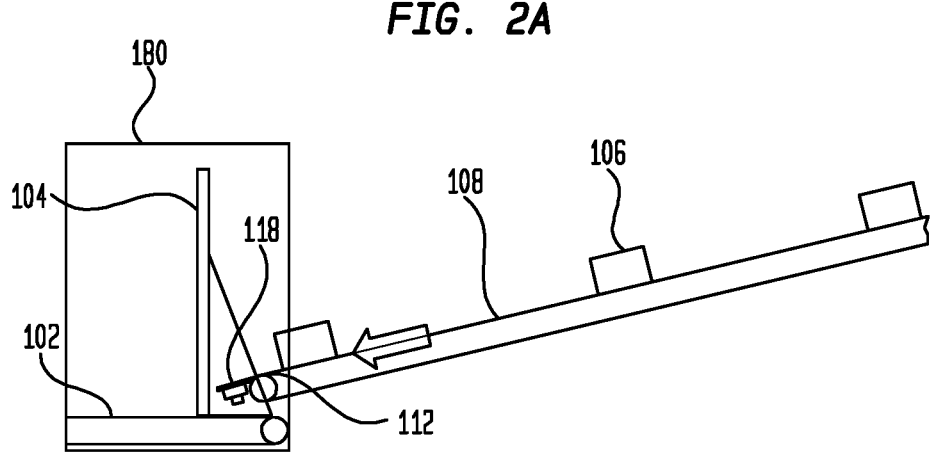
FIGS. 2A-2C illustrate stacking in accordance with disclosed embodiments.
Figure 2B:
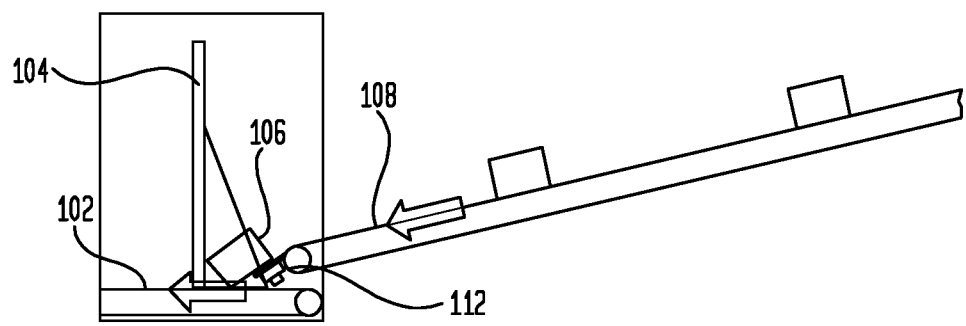
Figure 2C:
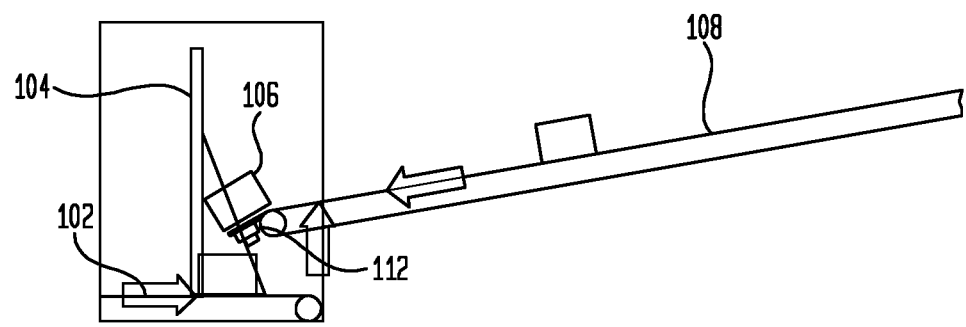

FIGS. 2A-2C illustrate stacking in accordance with disclosed embodiments, using elements as described in the example of FIG. 1.

FIG. 2A illustrates that the bi-directional conveyor 102 with back-stop 104 is initially positioned at a "home" position near the opening of container 180 (or similar position in another loading area). The discharge end 112 of conveyor boom section 108 is pivoted to its lowest height.

FIG. 2B illustrates that as parcels 106 or parcels of a known length are driven from the discharge end 112 of conveyor boom section 108, bi-directional conveyor 102 and back-stop 104 index at a speed at the same speed as conveyor boom section 108, the appropriate distance to accept the entire parcel 106 or multiple parcels.

FIG. 2C illustrates stacking, in which the discharge end 112 of conveyor boom section 108 is raised to align its lower edge with the top surface upon which subsequent parcel 106 or parcels are to be stacked, and the bi-directional conveyor 102 is moved back toward the door so that the leading edge of the parcel 106 or parcels is at the back-stop 104.

During these processes, the sensor pod 118 can be used to scan the profile of the loading area 120 (e.g., the space on bi-directional conveyor 102, or on top of a lower parcel, between the discharge end 112 of conveyor boom section 108 and the back-stop 104, or similar position in another loading area) to ensure accurate placement of items in loading, and to prevent damage that could be caused by dropping items, or crushing items as the conveyor boom section 108 and bi-directional conveyor 102 are manipulated during loading. In various embodiments, the control system 170 can be connected to control the bi-directional conveyor of the container or other loading area, if so equipped.

The sensor pod 118 is used to scan the profile of the loading area, to ensure accurate placement of items in loading, and to prevent damage that could be caused by dropping items or crushing items as the conveyor boom section 108 and bi-directional conveyor 102 are manipulated during loading. Sensor pod 118 is controlled by control system 170 and can be implemented, for example, as a camera, an infrared scanner, a sonic scanner, touch sensors or switches, or otherwise.

Figure 3A:
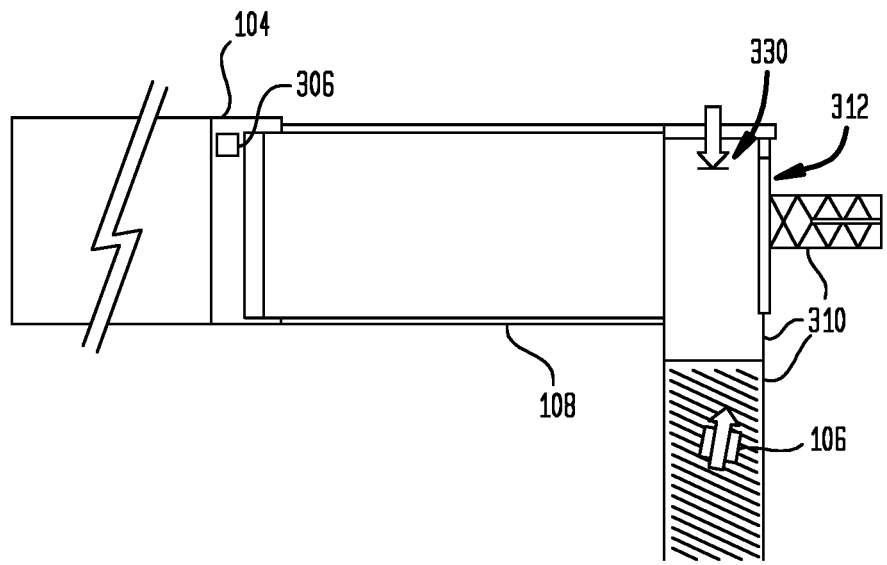
FIGS. 3A-3D illustrate a disclosed process and system as viewed from above.

FIGS. 3A-3D illustrate a disclosed process and system as viewed from above. Shown from above, one disclosed method for transferring parcels to the conveyor is seen in an aligning system 310, that can also be part of parcel processing system 100, and that is capable of aligning multiple parcels on an edge 312, of creating an offset for the parcel of a specific distance from the edge, and of transferring one or more aligned parcels to the conveyor boom section 108. Offset 330 is illustrated in FIG. 3A, to accommodate parcel 306.

In the example of FIGS. 3A-3D, a parcel 306 is already loaded at the back-stop 104. An offset 330 is created to allow for parcels being loaded to clear the parcel that is already present, as measured by the sensor pod 118.

Figure 3B:
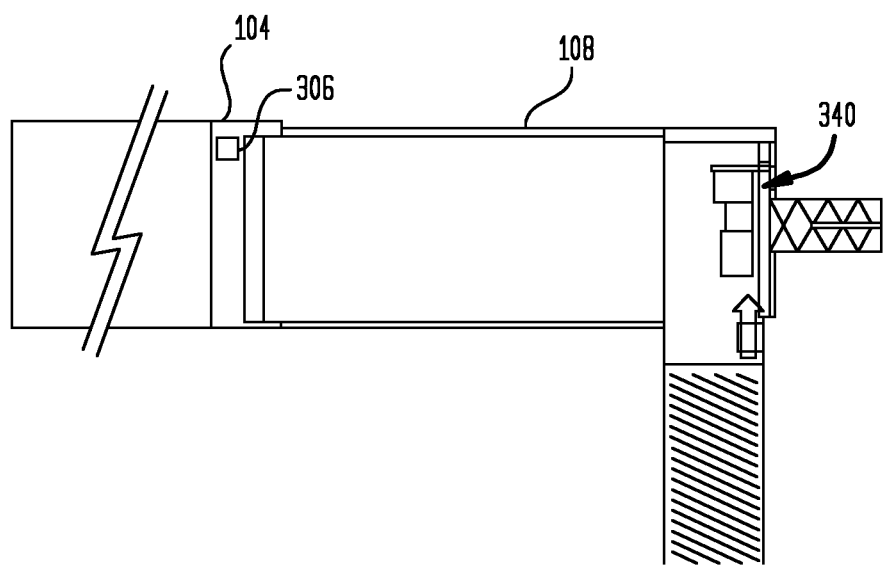

As illustrated in FIG. 3B, disclosed systems can accumulate multiple parcels, which can make up all or part of a "course" 340 in the load. The parcels in course 340 are aligned and offset according to computed offset 330 to account for the parcel 306 that has already been loaded. The length or other dimension of a parcel is known prior to its arrival, or by measurement of profiling sensor 116, which allows the system to determine when a course 340 is complete, or when the next parcel will not fit in the course. Profiling sensor 116 is controlled by control system 170 and can be implemented, for example, as a camera, an infrared scanner, a sonic scanner, touch sensors or switches, or otherwise.

Figure 3C:
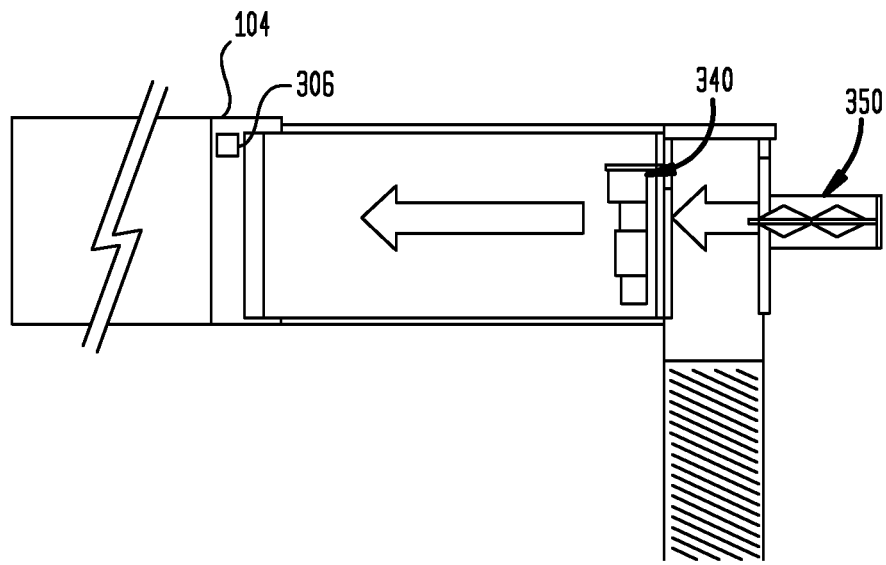

As illustrated in FIG. 3C, with the completed course, the scissor drive 350 pushes the course across to the conveyor boom section 108, and then retracts, allowing the parcels in the course 340 to travel the length of the conveyor boom section 108. While the parcels are transported on the conveyor boom section 108, another course can begin to be accumulated. The offset 330 may be adjusted after accumulation has begun to the extent of the accumulation.

Figure 3D:
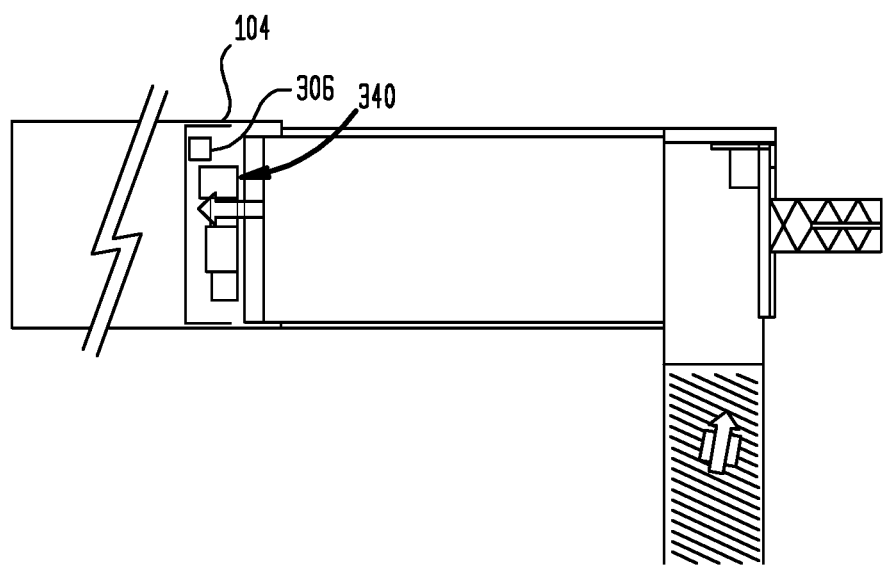

As illustrated in FIG. 3D, the transferred course 340 is loaded against the back-stop 104, next to parcel 306. Subsequently or concurrently, parcels for the next course, which may be stacked onto the loaded course, are accumulated, with the desired offset (in this case, no offset).

Once the entire container (or trailer, parcel pallet, etc) has been loaded, it may be removed and transported, or unloaded in place, pivoting the discharge end 112 of conveyor boom section 108 to its highest raised position, and activating bi-directional conveyor 102 to drive the parcels out of the container, onto the unloading conveyor/cascade 130 illustrated in FIG. 1.

Disclosed embodiments offer an automatic loading solution for applications in which extremely high volumetric efficiency is not needed and performs accumulation and buffering for loading processes that offer high volumetric efficiency to operate with continuous utilization.

Figure 4:
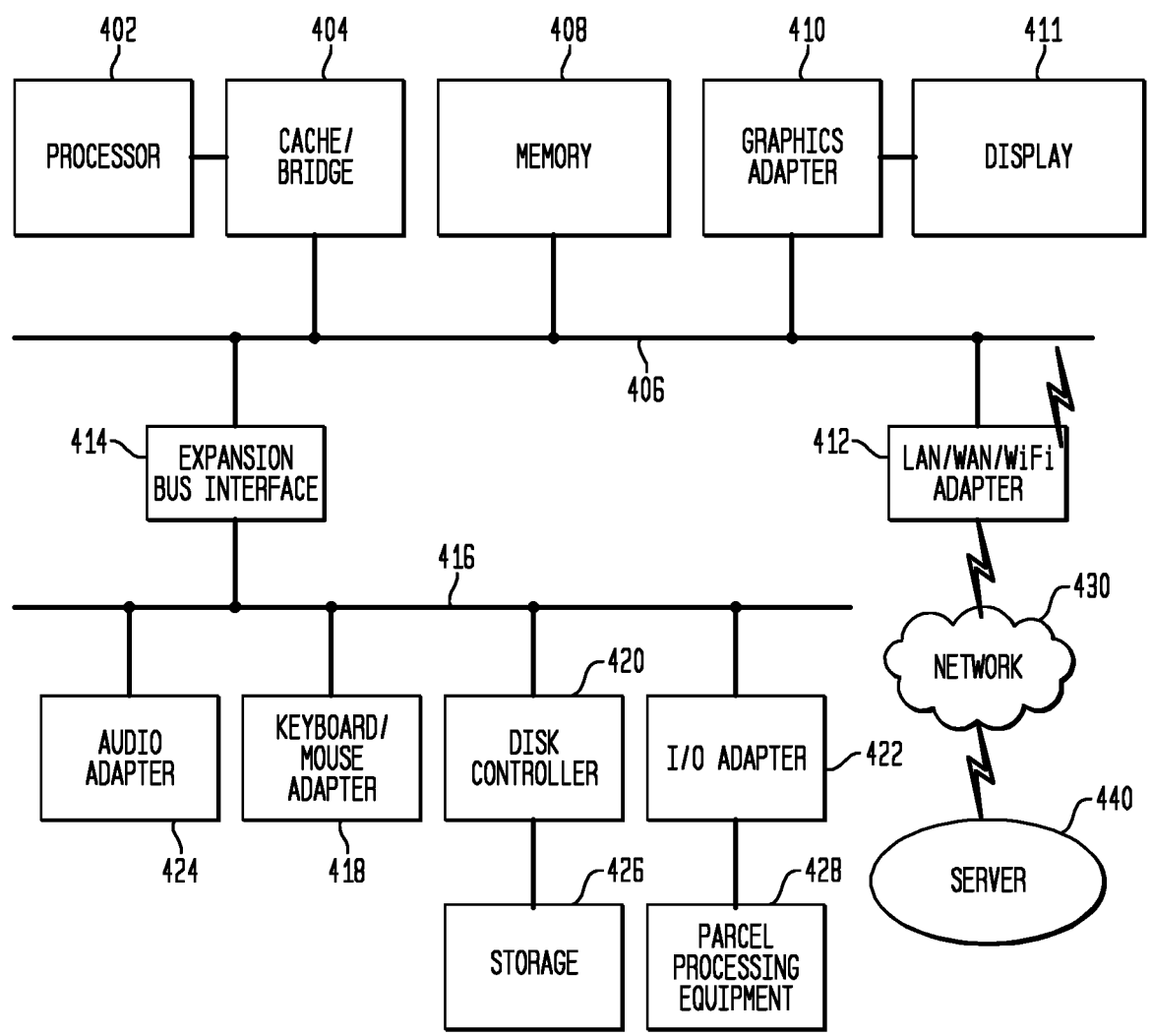
FIG. 4 depicts a block diagram of a data processing system with which an embodiment can be implemented.

FIG. 4 depicts a block diagram of a data processing system 400 with which an embodiment can be implemented, for example as a system for implementing any of the devices, methods, or systems described herein, and can be configured to perform processes as described herein. The data processing system depicted includes a processor 402 connected to a level two cache/bridge 404, which is connected in turn to a local system bus 406. Local system bus 406 may be, for example, a peripheral component interconnect (PCI) architecture bus. Also connected to local system bus in the depicted example are a main memory 408 and a graphics adapter 410. The graphics adapter 410 may be connected to display 411.

Other peripherals, such as local area network (LAN)/Wide Area Network/Wireless (e.g. WiFi) adapter 412, may also be connected to local system bus 406. Expansion bus interface 414 connects local system bus 406 to input/output (I/O) bus 416. I/O bus 416 is connected to keyboard/mouse adapter 418, disk controller 420, and I/O adapter 422. Disk controller 420 can be connected to a storage 426, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

I/O adapter 422 can be connected to control or communicate with parcel processing equipment 428, which can include transport devices or conveyors, sensors, booms, or any other hardware disclosed herein or other hardware devices for processing parcels in accordance with the various embodiments described herein.

Also connected to I/O bus 416 in the example shown is audio adapter 424, to which speakers (not shown) may be connected for playing sounds. Keyboard/mouse adapter 418 provides a connection for a pointing device (not shown), such as a mouse, trackball, trackpointer, etc.

Those of ordinary skill in the art will appreciate that the hardware depicted in FIG. 4 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 412 can be connected to a network 430 (not a part of data processing system 400), which can be any public or private data processing system network or combination of networks, as known to those of skill in the art, including the Internet. LAN/WAN/Wireless adapter 412 can also perform other data processing system or server processes described herein. Data processing system 400 can communicate over network 430 with one or more server systems 440, which are also not part of data processing system 400, but can be implemented, for example, as separate data processing systems 400. A server system 440 can be, for example, any of the other systems described herein, and so indicates how systems can intercommunicate over network 430.

Figure 5:
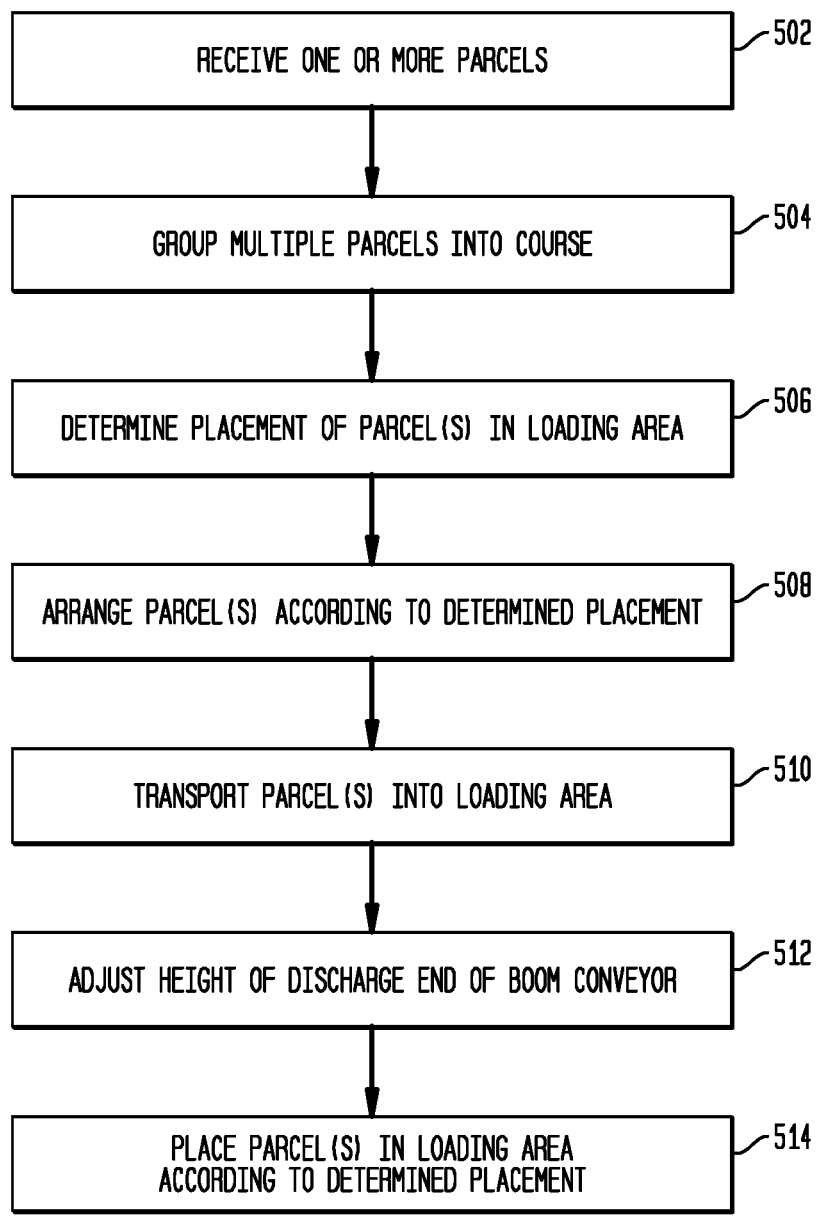
FIG. 5 illustrates a process in accordance with disclosed embodiments.

FIG. 5 illustrates a process 500 in accordance with disclosed embodiments, as performed, for example, by a parcel processing system as disclosed herein.

The parcel processing system receives one or more parcels for placement in a loading area (502). As described above, the loading area can be a designated space in a warehouse or other facility, a parcel pallet as described above, a trailer, a shipping container, or otherwise. The loading area can have a bi-directional conveyor disposed along its floor, and the conveyor can include a back-stop structure as described herein.

In some cases, the parcel processing system groups multiple parcels into a course of parcels by positioning and aligning them as described above (504). The "one or more parcels" can refer to individual parcels or a course of parcels treated as a group.

The parcel processing system determines a placement of the one or more parcels in the loading area (506). This can include, for example, identifying the position and profile of the area in the loading area in which the one or more parcels will be deposited, such as by scanning the area using a sensor pod as described herein. This can include by identifying an offset placement for the one or more parcels, identifying an area on the bi-directional conveyor on which the one or more parcels are to be placed, or identifying parcels already in the loading area on which the one or more parcels are to be stacked.

The parcel processing system physically arranges the one or more parcels according to the determined placement (508). This can include arranging one or more parcels directly on the boom conveyor section or arranging the one or more parcels using an aligning system and moving the arranged parcels onto the boom conveyor section.

The parcel processing system transports the one or more arranged parcels along a boom conveyor section into the loading area (510).

The parcel processing system adjusts the height of a discharge end of the boom conveyor section according to the determined placement (512).

The parcel processing system places the one or more parcels into the loading area according to the determined placement (514). This can include transporting the one or more parcels off of the discharge end of the boom conveyor at a height so that the one or more parcels are placed in the determined placement against the back-stop structure or parcels already in the loading area, either on the bi-directional conveyor or on the parcels already in the loading area, without causing the one or more parcels to fall a distance that could damage them.

It is important to note that while the disclosure includes a description in the context of a fully functional system, those skilled in the art will appreciate that at least portions of the mechanism of the present disclosure are capable of being distributed in the form of a computer-executable instructions contained within a machine-usable, computer-usable, or computer-readable medium in any of a variety of forms to cause a system to perform processes as disclosed herein, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto. For example, various embodiments include systems, methods, and computer-readable media.

Although an exemplary embodiment of the present disclosure has been described in detail, those skilled in the art will understand that various changes, substitutions, variations, and improvements disclosed herein may be made without departing from the spirit and scope of the disclosure in its broadest form. In the processes described above, various steps may be performed sequentially, concurrently, in a different order, or omitted, unless specifically described otherwise. Similarly, various elements of the systems and apparatuses described herein can be duplicated, rearranged, or omitted in various embodiments, unless described or claimed otherwise.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A parcel processing system, comprising:
a boom conveyor section configured to:
extend into a loading area;
transport parcels into the loading area; and
adjust a height of a discharge end of the boom conveyor section;
a sensor pod configured to scan the loading area into which the parcels can be placed; and
a control system configured to:
determine a placement of the one or more parcels in the loading area based on information from the sensor pod;
control an aligning system to physically arrange the one or more parcels on the boom conveyor section according to the determined placement;
control the boom conveyor section to transport one or more parcels into the loading area;
control the height of the discharge end of the boom conveyor section according to the determined placement; and
control the boom conveyor section to place the one or more parcels from the discharge end of the boom conveyor section directly into the loading area according to the determined placement.

2. The parcel processing system of claim 1, wherein the loading area comprises a bi-directional conveyor disposed along a floor of the loading area, and a backstop structure is mounted on the bi-directional conveyor.

3. The parcel processing system of claim 1, wherein the control system is configured to control the aligning system to transfer the one or more parcels to the boom conveyor section with an offset from an edge, the offset corresponding to a parcel already in the loading area.

4. The parcel processing system of claim 1, wherein the control system is configured to obtain a dimension of the one or more parcels via a profiling sensor and arrange the one or more parcels according to the determined placement.

5. The parcel processing system of claim 1, further comprising an aligning system configured to arrange the one or more parcels.

6. The parcel processing system of claim 1, wherein the control system is further configured to control the aligning system to accumulate and arrange the one or more parcels into a course of parcels that is placed together by the boom conveyor section into the loading area according to the determined placement.

7. The parcel processing system of claim 1, wherein the determined placement is on a bi-directional conveyor disposed on a floor of the loading area.

8. The parcel processing system of claim 1, wherein the determined placement is against a back-stop structure mounted on a bi-directional conveyor disposed on a floor of the loading area.

9. The parcel processing system of claim 1, wherein the determined placement is stacked on top of one or more parcels already in the loading area.

10. The parcel processing system of claim 1, wherein the control system is connected to control the motion of a bi-directional conveyor disposed on a floor of the loading area.

11. The parcel processing system of claim 1, wherein the control system is connected to control the motion of a bi-directional conveyor disposed on a floor of the loading area to unload the parcels from the container.

12. The parcel processing system of claim 1, wherein the control system is configured to track positions of the one or more parcels.

13. A method performed by a parcel processing system, comprising:
receiving one or more parcels for placement in a loading area;
determining a placement of the one or more parcels in the loading area by a control system based on information from a sensor pod that scans the loading area into which the parcels can be placed;
controlling an aligning system by the control system to physically arrange the one or more parcels on a boom conveyor section according to the determined placement; and
controlling the boom conveyor section by the control system to:
transport the one or more arranged parcels along the boom conveyor section into the loading area;
adjust the height of a discharge end of the boom conveyor section according to the determined placement; and
place the one or more parcels from the discharge end of the boom conveyor section directly into the loading area according to the determined placement.

14. The method of claim 13, further comprising controlling the aligning system by the control system to accumulate and arrange the one or more parcels into a course of parcels, and placing the course of parcels by the boom conveyor section into the loading area according to the determined placement.

15. The method of claim 13, wherein the loading area includes a bi-directional conveyor disposed along a floor of the container and a back-stop structure mounted on the bi-directional conveyor.

16. The method of claim 13, wherein determining the placement by the control system includes identifying a position and profile of the loading area in which the one or more parcels will be deposited.

17. The method of claim 13, comprising controlling the aligning system by the control system to transfer the one or more parcels to the boom conveyor section with an offset from an edge, the offset corresponding to a parcel already in the loading area.

18. The method of claim 13, wherein the determined placement is on a bi-directional conveyor disposed on a floor of the loading area.

19. The method of claim 13, wherein the determined placement is stacked on top of one or more parcels already in the loading area.

* * * * *